United States Patent [19]

Ideno et al.

[11] Patent Number: 5,639,993

[45] Date of Patent: Jun. 17, 1997

[54] GROMMET

[75] Inventors: Satoru Ideno; Takayoshi Ito; Isao Tsuji, all of Yokkaichi; Masaki Kugita; Isamu Osako, both of Hiroshima, all of Japan

[73] Assignees: Sumitomo Wiring Systems Ltd., Suzuka; Molten Corporation, Hiroshima, both of Japan

[21] Appl. No.: 502,318

[22] Filed: Jul. 13, 1995

[30] Foreign Application Priority Data

Jul. 19, 1994 [JP] Japan .................................... 6-187937

[51] Int. Cl.⁶ .............................. H01B 17/58; H02G 3/22
[52] U.S. Cl. .......................................... 174/153 G; 248/56
[58] Field of Search ........................... 174/152 G, 153 G, 174/65 G; 16/2; 248/256

[56] References Cited

U.S. PATENT DOCUMENTS

| | | | |
|---|---|---|---|
| 4,839,937 | 6/1989 | Oikawa et al. | 174/152 G X |
| 4,912,287 | 3/1990 | Ono et al. | 174/153 G |
| 5,338,898 | 8/1994 | Luciano et al. | 174/138 F |

FOREIGN PATENT DOCUMENTS

| | | | |
|---|---|---|---|
| 64-45420 | 3/1989 | Japan . | |
| 1-150418 | 10/1989 | Japan . | |
| 1-251521 | 10/1989 | Japan | 174/153 G |
| 3-5008 | 1/1991 | Japan . | |
| 5-36720 | 5/1993 | Japan . | |
| 5-198228 | 8/1993 | Japan | 174/152 G |

Primary Examiner—Hyung S. Sough
Attorney, Agent, or Firm—Armstrong, Westerman, Hattori, McLeland & Naughton

[57] ABSTRACT

A grommet which is easy to install in a grommet hole of an automobile panel and has good water sealing ability. The grommet is assembled from a pair of grommet halves 21a and 21b, which include a pair of plastic leading members 1a and 1b, respectively, to form a leading section of the grommet; a pair of semi-disc plastic members 6a and 6b, respectively, to form an disc section of the grommet; and a pair of resilient members 12a and 12b, respectively, joining the members 1a and 1b with the semi-disc members 6a and 6b, respectively, to form a resilient section of the grommet. The resilient member shave semi-circumferential grooves 15a and 15b, which together form a complete circumferential groove 15 for receiving the edge of the panel defining the grommet hole when the grommet halves are coupled together. The disc section has a diameter larger than that of the leading section and the resilient section. The grommet halves are coupled together after wiring harnesses are placed therein, and locked by a locking mechanism provided on the outer surface of the grommet.

7 Claims, 6 Drawing Sheets

GROMMET

FIELD OF THE INVENTION

This invention relates to a grommet, and more particularly to a grommet for use with wiring harnesses passing through a panel partitioning two rooms such as an engine room and a passenger room of an automobile.

BACKGROUND OF THE INVENTION

An automobile has many electric wires for electrically connecting its engine room and passenger room across a partitioning panel separating the two rooms. A typical grommet, fitted in a hole of the panel for receiving the wiring harnesses passing there through, is made of a resilient material such as rubber, and has a generally cylindrical form, as disclosed in Japanese Utility Model Early Publication 1-150418. Such grommet requires tedious manipulations in accommodating wiring harnesses since the inner passage must be widened prior to insertion of accepting the wiring harnesses.

In an attempt to improve efficiency in installing grommets, a hard grommet has been proposed in Japanese Utility Model Early Publication 5-36720. A hard grommet is essentially made up of two generally leading members of relatively rigid material like hard plastics. Since it has appropriate rigidity, it is fairly easy to install wiring harnesses through the grommet without widening the passage of the grommet.

However, this type of hard grommet has a disadvantage that the hard members have poor sealing ability between their mating faces and often allows rain drops to come into the grommet through the mating faces. This can happen because the two leading members merely abut on each other on the mating faces.

A hard grommet as disclosed in Japanese Patent Early Publication 3-5008 utilizes soft filler. In this grommet, wiring harnesses are placed between two hinged leading members, which are then mated each other and locked by a lock mechanism provided thereon. The grommet is then dipped in a vinyl chloride plasti-sol so that the entire grommet is covered with soft plastic filler of vinyl chloride, thereby providing necessary water proof film on the grommet. The film is also useful in sealing a gap between the grommet and a grommet hole in which the grommet is installed. However, this type of grommet has a disadvantage in that it has a rather complex configuration and hence requires complex manufacturing steps. Furthermore, once the vinyl chloride film is formed on the grommet, they cannot be disintegrated for reuse.

The Japanese Utility Model Early Publication 5-35720 also discloses a grommet which includes two-part hard inners. The grommet is not provided with any sealant. That is, the hard grommet is adapted to fit loosely in a grommet hole. Thus, the grommet fails to stop the raindrops coming through the hole.

Another disadvantage pertinent to these hard type prior art grommets of the is that they must be forced into a grommet hole in a panel by a relatively large might, requiring extra effort by a worker.

A grommet is also used to hold wiring harnesses in desired configuration in a given position. For example, a grommet disclosed in Japanese Utility Model Early Publication 6-27255 utilizes a bellow for flexibly holding wiring harnesses in a narrow space. With this grommet, however, it is difficult to constrain wiring harnesses in a desired orientation because of the flexibility of the bellow.

It is, therefore, an object of the invention to provide an improved hard grommet having hard sections for receiving there between wiring harnesses without difficulty as well as a resilient section that may hermetically fit in a grommet hole of a panel in, providing good seal for the grommet hole.

In accordance with the invention, there is provided a grommet which includes a pair of grommet halves. The grommet halves have at least one lock mechanism for locking said grommet halves in coupled condition after the grommet halves are mated together on their mating faces. The grommet halves each have: a generally semi-cylindrical hard member having a mating face; a hard semi-disc member having a mating face; and a generally semi-frusto-conic resilient member joining the leading member and said semi-disc member and having a semi-annular groove and mating faces which are contiguous with the mating faces of the leading member and the semi-disc member so as to form the mating faces of the grommet halves. The leading members, the semi-disc members, and the resilient members form a generally cylindrical hard section, a hard disc section, and a generally frusto-conic resilient section of the grommet, respectively, when mated together. The disc section is larger in outer diameter than the leading section and the resilient frusto-conic section. The resilient section has a circumferential groove formed on its outer surface as a result of mating the resilient members. The annular groove is adapted to receive the edge of a panel defining a grommet hole. When the resultant grommet is inserted in a grommet hole of a panel, an annular groove of the resilient section tightly engages the edge of the panel defining the hole, thereby preventing rain drops from infiltrating through the hole.

It should be noted that the hard cylindrical section and the hard disc section stay on the opposite sides of the panel and retain the wiring harnesses in the desired configurations on both sides of the panel. This is the case even when the wiring harnesses had kinks before they are placed in the grommet.

Most parts of the grommet may be made of materials having less specific gravity than rubber, so that the entire weight of the grommet is notably reduced than that of a conventional rubber grommet.

It should be also noted that the resilient section has enough elasticity to allow for deformation experienced during its installation into the grommet hole. That is, the grommet may be easily inserted in the grommet hole with a little might. The grommet halves may be unlocked and disintegrated, if desired, so that they can be reused repeatedly.

The grommet of the invention may be provided with resilient seals between the mating faces of the grommet halves, which provides water-proof seal between them, so that rain drops are prevented from entering into the grommet.

In another aspect of the invention, there is provided a grommet having a bent configuration for holding wiring harnesses in a specified configuration. This grommet is advantageous in holding wiring harnesses in a desired configuration in a limited space.

The grommet may be provided with means for holding another element at a specified position. For example, the grommet may hold thereon a connector for conveniently connecting some of the wiring harnesses diverging from the grommet with other electrical devices.

BRIEF DESCRIPTION OF THE DRAWINGS

The invention will now be described by way of example with reference to accompanying drawings, in which.

DETAILED DESCRIPTION OF THE PREFERRED EMBODIMENT

Figure 1:
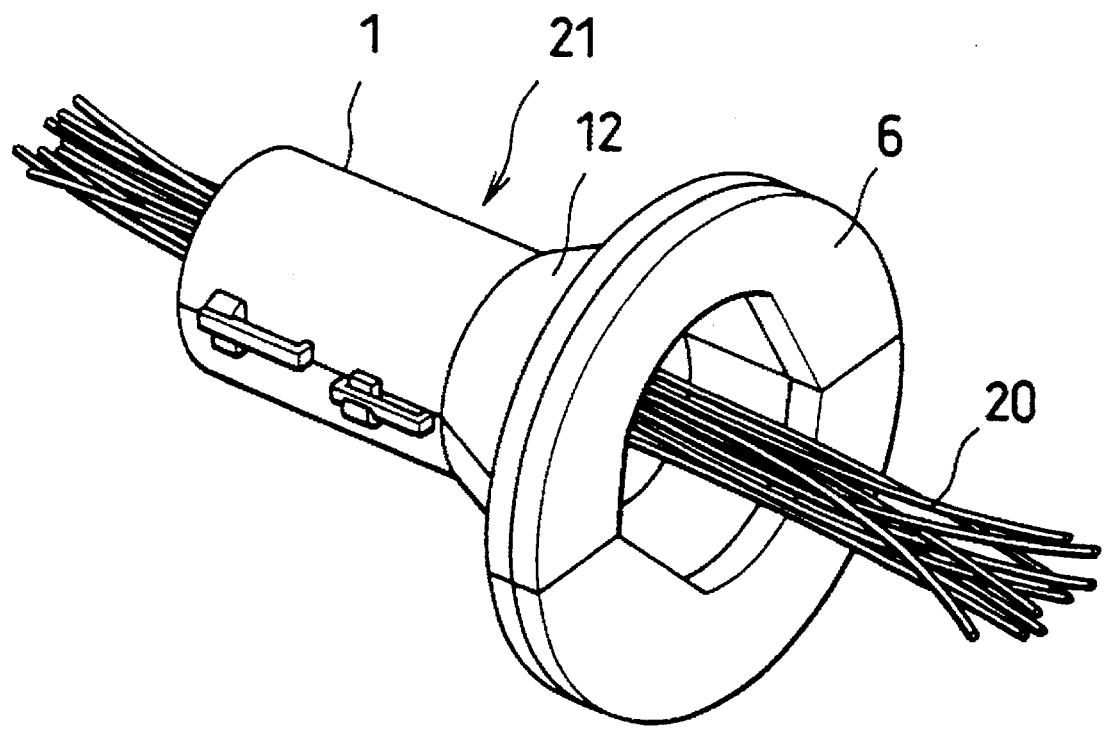
FIG. 1 is a perspective view of two-part members of a first glomet of the invention, illustrating how it holds wiring harnesses.

Referring now to FIGS. 1 and 2, there is shown a first example of a grommet 21 according to the invention. The grommet 21 is designed to hold therein wiring harnesses 20 and to be fitted in a grommet hole 17 of a panel 16 such as a panel which partitions partitioning an engine room from a passenger room of a car. The grommet has a resilient annular portion 13 which has a circumferential groove 15 for receiving therein the tip of the panel defining the grommet hole. The grommet is composed essentially of grommet halves, as described in detail later.

Figure 2A:
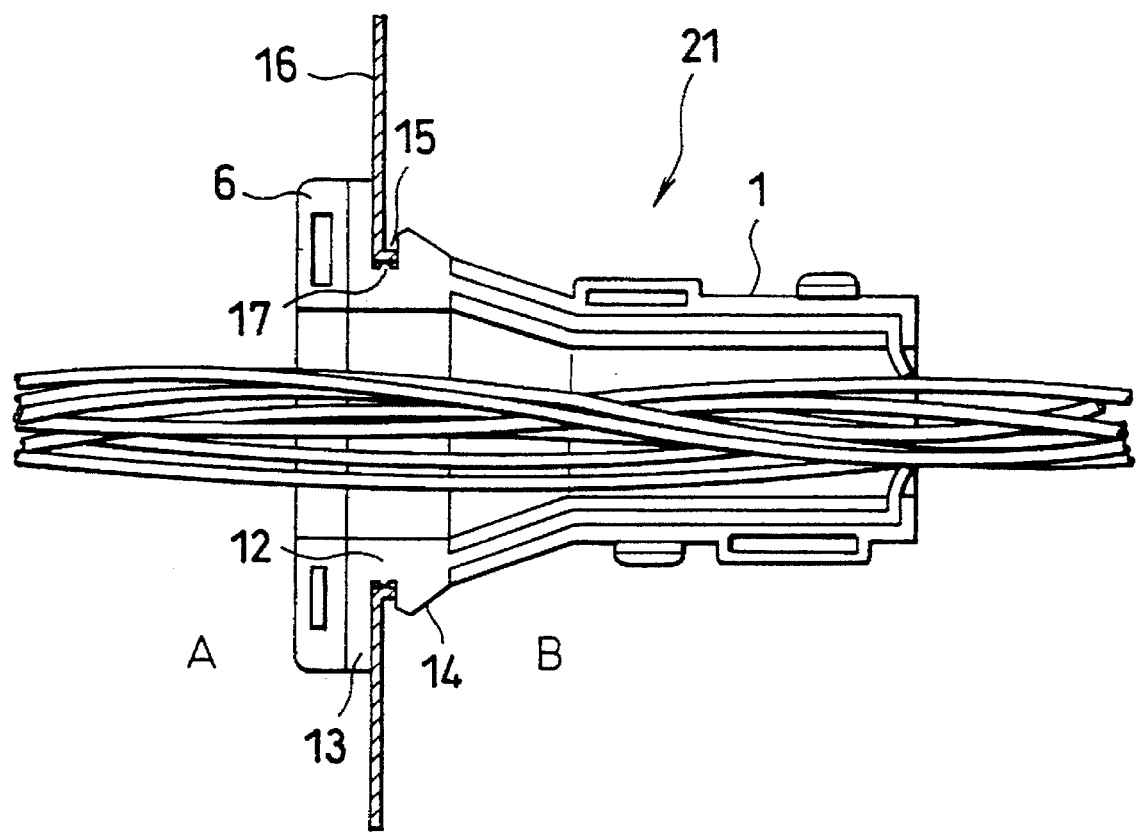
FIG. 2A is a longitudinal cross section of the grommet of FIG. 1, installed in a grommet hole of a panel to hold wiring harnesses.

The grommet 21 has: a leading section 1 which is in general a hard section including a leading cylindrical portion and a trailing frusto-conic portion; a hard disc section 6; and a resilient section 12 joining the hard frusto-conic portion of the leading section 1 and the disc section 6. The leading end of the resilient section is configured to be contiguous with the hard frusto-conic portion of the section 1, so that they together form a frusto-conic section. (The frusto-conic portion of the resilient section will be referred to as sloped resilient portion.) The grommet 21 is fit in the grommet hole 17 by inserting the leading section into the hole 17 and forcing the resilient section 12 into the hole until the annular portion 13 abuts on the panel 16 and trapps the tip of the hole 17 in the annular groove 15 of the resilient section 12. The groove 15 is formed in an intermediate portion (hereinafter referred to as grooved portion) of the resilient section 12 between the annular portion 13 and the sloped resilient portion 14. The tip of the panel defining the grommet hole 17 is deformed forming a round "curb" as shown in FIG. 2A, which curb firmly sits on the bottom of the groove 15, thereby forming a water-proof seal to prevent rain drops from infiltrating through the hole 17. In order to provide such seal, the outer diameter of the grooved portion is greater than the diameter of the grommet hole 17.

Figure 2B:
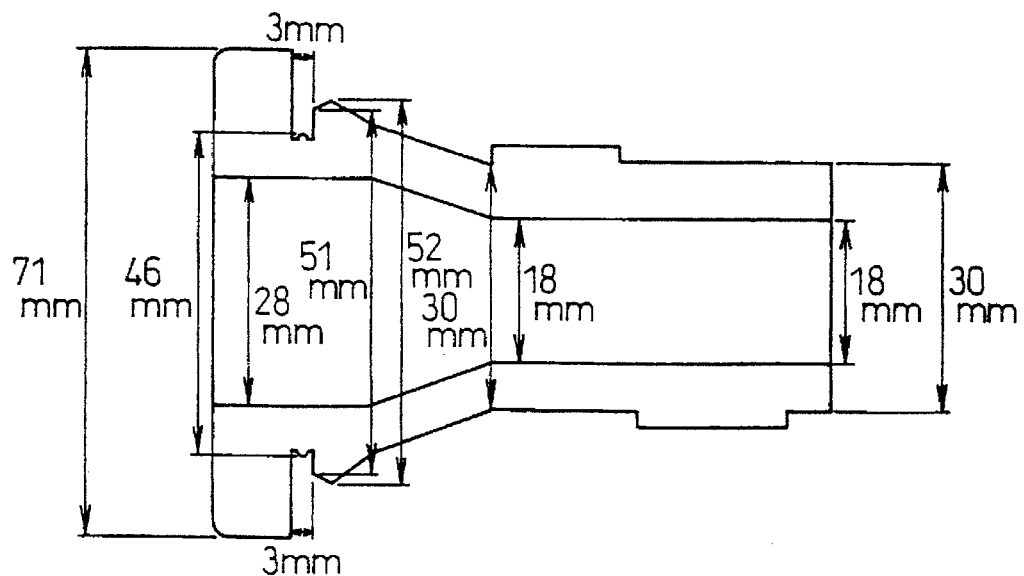
FIG. 2B illustrates typical dimensions of various portions of the grommet.

Referring to FIG. 2B, there is shown dimensions of various portions of the grommet. In order to facilitate insertion of the grommet in the grommet hole, the leading end of the frusto-conic section has the same outer diameter as the cylindrical end of the section 1, which is smaller than that of the grommet hole 17. In this example shown herein, the leading end of the plastic cylindrical section has an outer diameters of about 30 mm, while the trailing end of the frusto-conic section has an outer diameters of about 52 mm. The disc portion 6 has a still larger outer diameter of about 71 mm, and has thickness of about 5 mm. The inner diameter of the leading end of the cylindrical section and the disc section are 18 mm and 28 mm, respectively. The inner diameter of the frusto-conic section connecting the cylindrical potion of the leading section with the disc section thus ranges from 18 mm to 28 mm, as shown in FIG. 2B. The diameter of the bottom of the groove 15 is about 46 mm. The width of the groove is about 3 mm. In order to facilitate snapping of the grommet into a grommet hole, the outer diameter of the trailing end of the frusto-conic section, namely the outer diameter of the groove 15, may be smaller than 52 mm, by a small amount of 1 mm, for example, over width of a few millimeter. (The dimensions shown in the figures are not to scale: for example, the slope of the frusto-conic section is a little exaggerated for clarity of illustration.)

Figure 3:
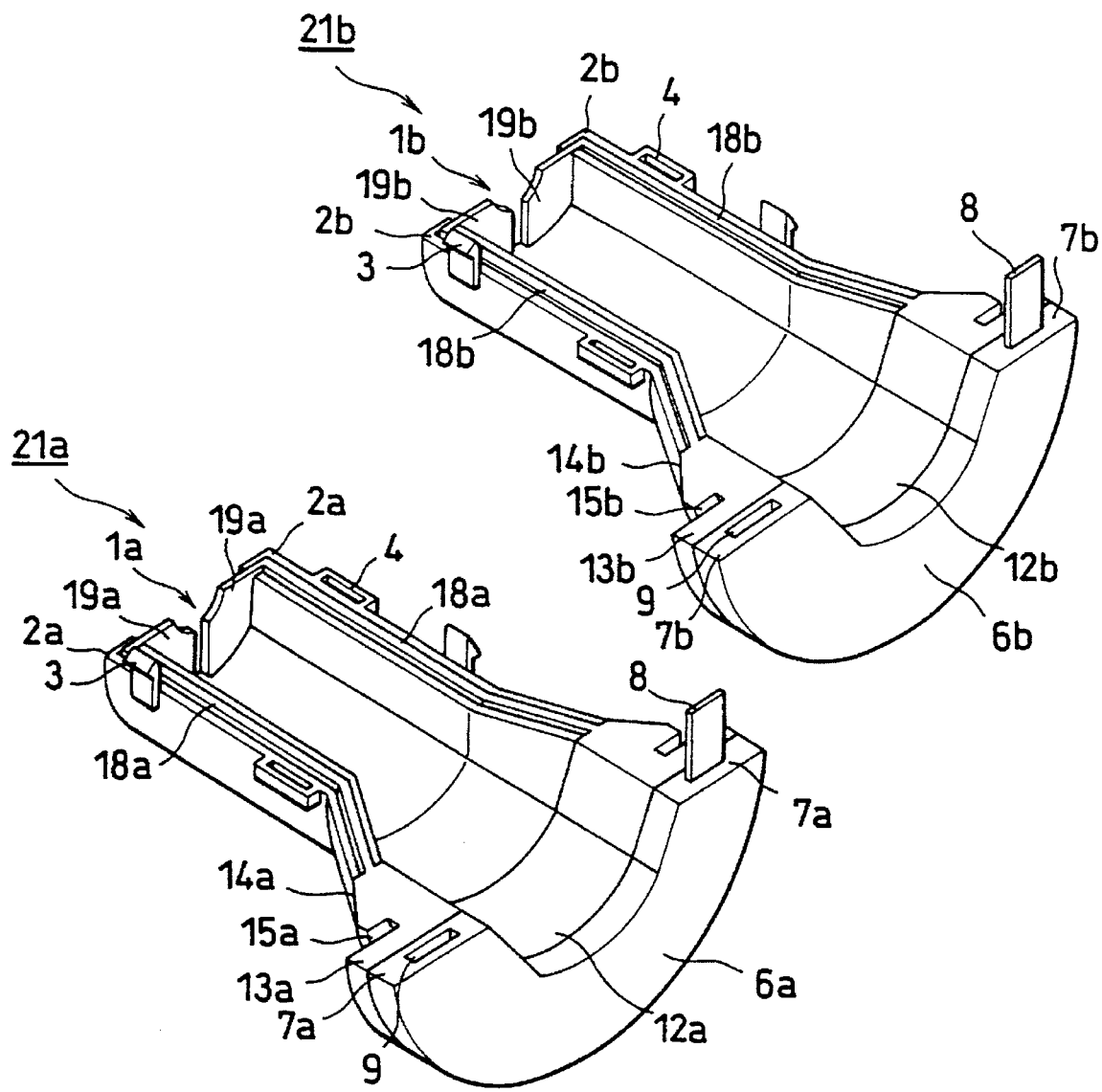
FIG. 3 is a perspective view of the grommet halves before they are assembled to a grommet of FIG. 1.

Referring now to FIG. 3, there is shown a pair of grommet halves 21a and 21b before they are assembled into a single grommet 21. The grommet halves 21a and 21b each have a connecting tongue 8 and a mouth 9 for receiving therein the connecting tongue 8, and locking mechanisms having pawls 3 which are adapted to engage belts 4 so as to lock the mated grommet halves 21a and 21b. In this example shown herein, two such pawl-belt pairs are provided on the grommet. As a result of the tongue-mouth mechanism and the locking mechanisms, the grommet halves form an integral grommet 21 when they are mated together and locked in position, thereby firmly holding therein wiring harnesses. There may be as many multiple locking mechanisms as necessary provided on the various positions of the grommet halves. Since the two halves are essentially the same in structure, only one of them 21a will be described in detail below, but it should be understood that like portions of the grommet halves 21a and 21b have the same feature.

The grommet half 21a includes: a leading member 1a which has a semi-cylindrical portion and a semi-frusto-conic portion; a semi-disc member 6a; and a resilient member 12a having sloped portion joined to the semi-frusto-conic portion of the leading member 1a, an intermediate portion, and a semi-annular portion joined to the the semi-disc member 6a, as described in detail later. The sloped portion of the resilient member 12a has a semi-frusto-conical configuration, forming a resilient portion of the frusto-conic section. The leading member 1a and the semi-disc member 6a (FIG. 4) are both pre-fabricated by injection molding of a plastic having required rigidity such as polypropylene.

The leading member 1a has planar mating faces 2a, which are pressed against the mating faces 2b of the mating grommet half 21b. The mating faces 2a have grooves 5a (FIG. 4) formed therein.

The semi-disc member 6a has a mating faces 7a to be mated with the mating face 7b of the mating grommet half. Engagement of the tongue 8 and corresponding mouth 9 enables alignment of the grommet halves with each other.

Figure 4:
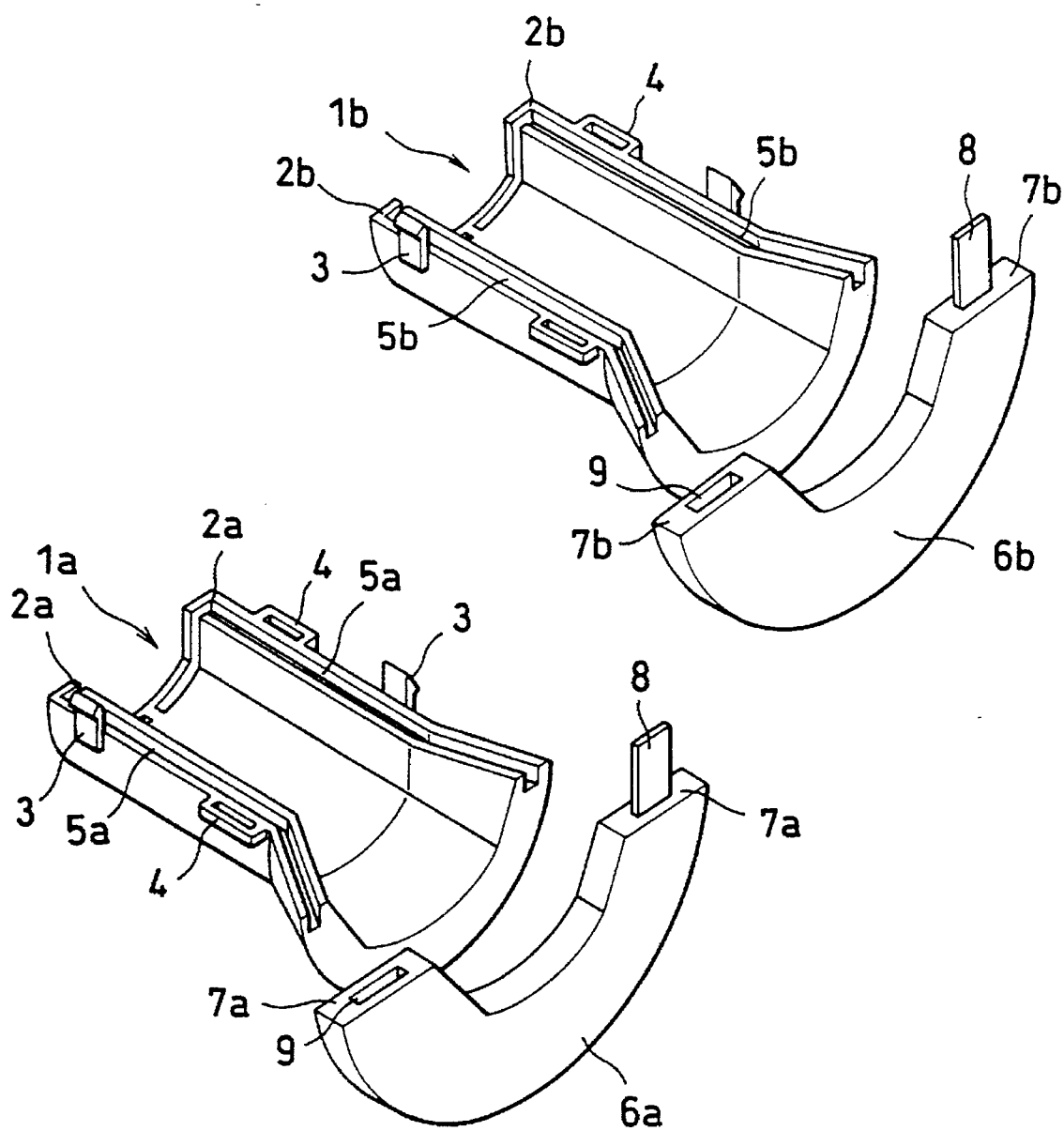
FIG. 4 is a perspective view of cylindrical members and the disc members of the grommet of FIG. 1.

The resilient member 12a may be made of rubber or plastic elastomer, having shore a hardness in the range of about 30 to 60, preferably of about 50, and has good affinity with the plastic material forming the leading member 1a and the semi-disc member 6a. Recommended materials are olefin elastomers and styrene elastomers. The resilient member 12a maybe formed by so-called double injection molding in which a molten materialis injected into a mold accommodating the leading member 1a and the semi-disc member 6a. The relative arrangement of the leading member 1a and semi-disc member 6a in the mold prior to the double injection molding is shown in FIG. 4. This double injection molding will provide a prefabricated complete grommet half 21a.

The resilient member 12a has a semi-annular portion 13a jointed to the semi-disc member 6a, a resilient sloped portion 14a jointed smoothly to a conic portion of the leading member 1a, and an intermediate portion between the semi-annular portion 13a and the semi-sloped resilient portion 14a. The intermediate portion has a circumferential groove 15a. The resilient member 12a is provided with two strips 18a extending from the leading ends of the sloped portion of the resilient member 12a into the grooves 5a of the leading member 1a. These strips are formed by injection molding when the resilient member 12a is molded. The elongate strips 18a has a width of about 2 mm and a height which slightly exceeds the depth of the grooves 5a by, for example, about 0.5 mm. The strips 18a is further provided with sealing tongues 19a which are formed at the leading end of the leading member 1a during the injection molding of the resilient member 12a. The sealing tongues 18a are configured to hold wiring harnesses 20 placed between the tongues 19a and 19b.

Figure 5:
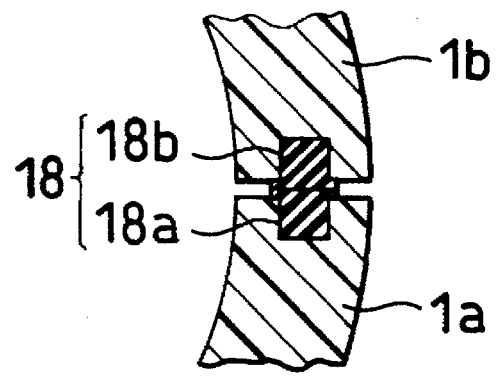
FIG. 5 is a partial transverse cross section of the grommet of FIG. 1, illustrating a seal formed between the grommet halves.

When the grommet halves are coupled together, the leading member 1a and its counter member 1b form the leading section 1; the resilient member 12a and its counter part 12b form the resilient section 12; and the semi-disc member 6a and its counter member 6b form the disc section 6, with the annular groove 15 formed on the coupled resilient members 12a and 12b, as shown in FIG. 2. The strips 18a and its counter part 18b are then pressed against each other to form tight seals 18 between the leading members 1a and 1b, as shown in FIG. 5.

Figure 6:
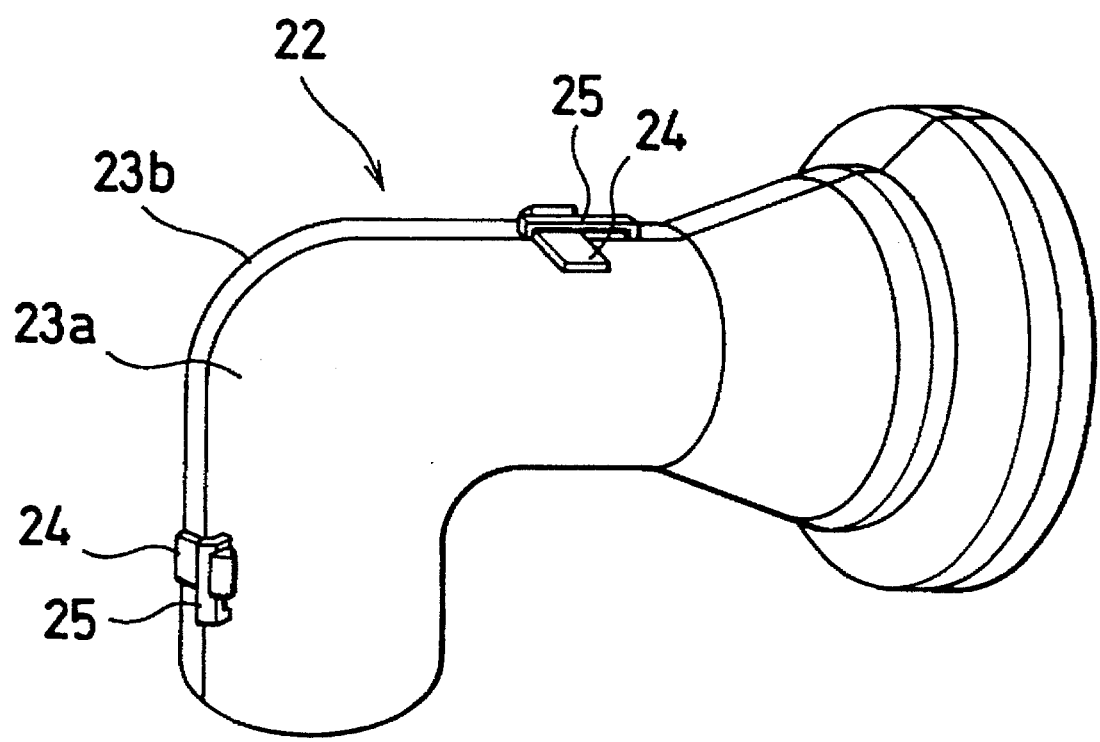
FIG. 6 is a perspective view of a second grommet.

Referring now to FIG. 6, there is shown a second example of grommet 22, which has an elbow section. This type of grommet is suitable for holding wiring harnesses in a prescribed bent configuration when an installation space is limited. The grommet is provided with locking mechanisms 24 and 25. The grommet may be composed of two grommet halves 23a and 23b, in just the same manner as the previous example 21.

Figure 7:
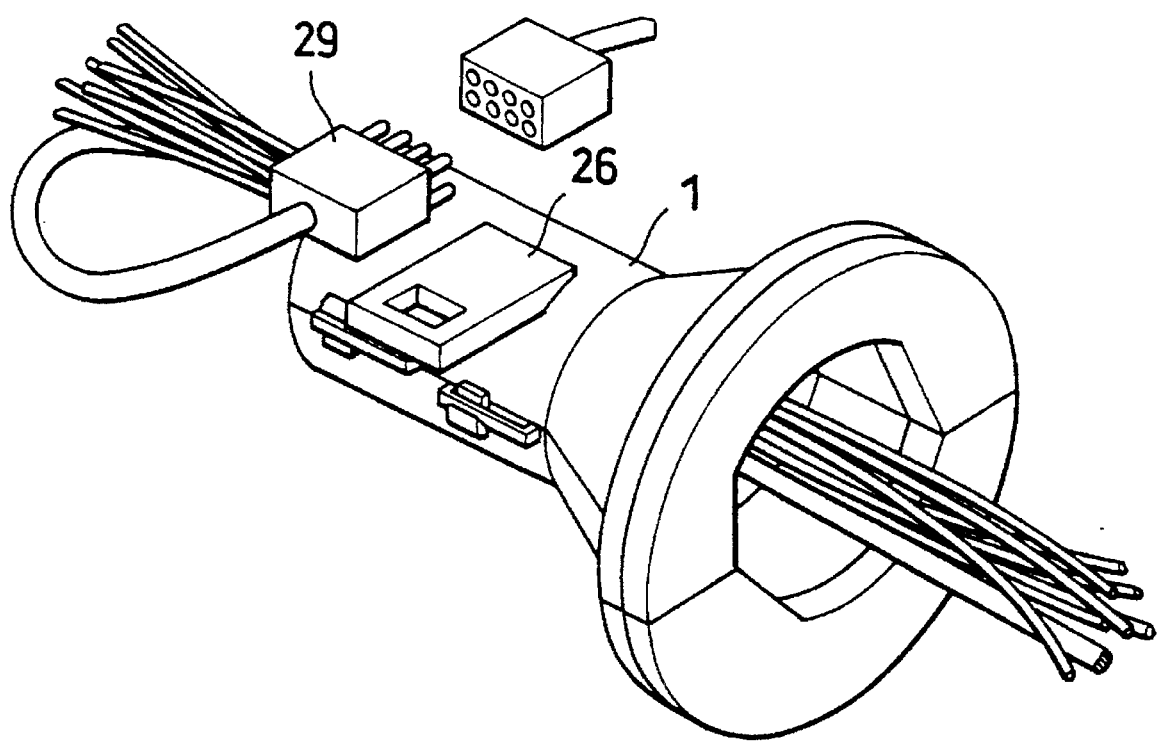
FIG. 7 is a perspective view of a third grommet.

Referring to FIG. 7, there is shown a third grommet of the invention, which is equipped with a holder 26 for holding an object 29 close to the grommet. For example, an electrical component such as a connector for wiring harnesses may be conveniently secured on the grommet by simply inserting the connector in the holder 26. This requires no clip or clamp for holding the connector on the frame of a car. No boring is needed in fastening clamps either, thereby improving assembling efficiency.

In all of the above examples, the semi-disc members 6a and 6b are aligned and secured by tongue 8 and mouth 9. It would be understood that the semi-disc members 6a and 6b could be provided with a locking mechanism as used for locking the leading members 1a and 1b.

It would be also understood that, instead of fabricating the grommet in two separate grommet halves as in the above example, they could be fabricated in the form of grommet halves hinged or connected on one sides with a flexible membrane. Such grommet requires a locking mechanism only on one side of the grommet remote from the hinges.

In order to provide sealing between the grommet and the wiring harnesses in the grommet, an appropriate sealant may be filled in the grommet after the harnesses are placed therein and the glomet halves are assembled. Such sealant is also advantageous in shutting off noises that would otherwise penetrate through the grommet. Non-rigid polyvinyl chlorides, non-rigid polyurethanes, expanded polyurethanes, flexible silicon plastics, and expanded silicon plastics may be used for this purpose.

What is claimed is:

1. A grommet comprising a pair of grommet halves mated together by at least one locking mechanism, wherein each of said grommet halves comprising:

a hard leading member having leading semi-cylindrical portion and semi-conical portion;

a hard semi-disc member having a mating face, said semi-disc member forming a disc section of said grommet, said disc section having an outer diameter larger than that of said leading member; and a resilient member having a sloped portion joined to said semi-conical portion of said hard leading member, a semi-annular portion joined to said hard semi-disc member, and a grooved portion positioned between said sloped portion and said semi-annular portion, wherein said grooved portion having a semi-annular groove formed on its outer surface so that said semi-annular grooves form a complete annular groove of said grommet for receiving an edge of a panel defining a grommet hole.

2. A grommet according to claim 1, wherein each of said hard leading members further comprises a mating face having a sealing grooves thereon and resilient sealing members are provided within said sealing groove on said mating face.

3. A grommet according to claim 1, wherein said leading member has an elbow section.

4. A grommet according to claim 1, wherein said grommet is provided with means for holding at least one object.

5. A grommet according to claim 1, wherein said grommet is sealed with a sealant filling gaps between said grommet and wiring harnesses to be placed in said grommet.

6. A grommet according to claim 2, wherein said resilient sealing members provided within said sealing groove of each of said hard leading members are integral with said resilient member.

7. A grommet according to claim 6, wherein each of said grommet halves further includes sealing tongues, wherein said resilient sealing member connects said sealing tongues and said resilient member and wherein said resilient member, said resistant sealing member and said sealing tongues are integrally formed.

* * * * *